US012623287B2

(12) United States Patent (10) Patent No.: US 12,623,287 B2
Hudelson et al. (45) Date of Patent: May 12, 2026

(54) SYSTEMS AND METHODS FOR POWDER BED DENSITY MEASUREMENT AND CONTROL FOR ADDITIVE MANUFACTURING

(71) Applicant: Arc Impact Acquisition Corporation, Burlington, MA (US)

(72) Inventors: George Hudelson, Billerica, MA (US); Paul Hoisington, Burlington, MA (US); Richard Remo Fontana, Cape Elizabeth, MA (US); Emanuel Sachs, Newton, MA (US); Christopher Anthony Craven, Burlington, MA (US); Matthew McCambridge, Burlington, MA (US)

(73) Assignee: ARC IMPACT ACQUISITION CORPORATION, Burlington, MA (US)

( * ) Notice: Subject to any disclaimer, the term of this patent is extended or adjusted under 35 U.S.C. 154(b) by 164 days.

(21) Appl. No.: 18/432,566

(22) Filed: Feb. 5, 2024

(65) Prior Publication Data

US 2025/0001500 A1 Jan. 2, 2025

Related U.S. Application Data

(62) Division of application No. 17/370,845, filed on Jul. 8, 2021, now abandoned.

(Continued)

(51) Int. Cl.
B22F 10/37 (2021.01)
B22F 10/14 (2021.01)
(Continued)

(52) U.S. Cl.
CPC .............. B22F 10/37 (2021.01); B22F 10/14 (2021.01); B22F 10/50 (2021.01); B22F 10/85 (2021.01);
(Continued)

(58) Field of Classification Search
CPC .......... B22F 10/37; B22F 10/50; B22F 10/85; B22F 12/13; B22F 12/90; B22F 2203/11;
(Continued)

(56) References Cited

U.S. PATENT DOCUMENTS 8,947,822 B1 2/2015 Rice et al.
2012/0220746 A1 8/2012 Kurihara et al.
(Continued)

FOREIGN PATENT DOCUMENTS

CN 109317663 A 2/2019
JP 2018193586 A 12/2018
(Continued)

OTHER PUBLICATIONS

Asencio et al, "Electrical capacitance sensor array to measure density profiles of a vibrated granular bed", 2015. Powder Technology, vol. 270, pp. 10-19 (Year: 2015).

*Primary Examiner* — Ricardo D Morales
(74) *Attorney, Agent, or Firm* — Lando & Anastasi, LLP

(57) ABSTRACT

Systems and methods are disclosed for forming a three-dimensional object using additive manufacturing. One method includes depositing a first amount of powder material onto a powder print bed of a printing system, spreading the first amount of powder material across the powder print bed to form a first layer, measuring a density of powder material within the powder print bed, and adjusting a parameter of the printing system based on the measured density of the powder material within the powder print bed.

14 Claims, 11 Drawing Sheets

Related U.S. Application Data

(60) Provisional application No. 63/049,936, filed on Jul. 9, 2020.

(51) Int. Cl.

| | |
|---|---|
| *B22F 10/50* | (2021.01) |
| *B22F 10/85* | (2021.01) |
| *B22F 12/13* | (2021.01) |
| *B22F 12/52* | (2021.01) |
| *B22F 12/53* | (2021.01) |
| *B22F 12/63* | (2021.01) |
| *B22F 12/90* | (2021.01) |
| *B33Y 10/00* | (2015.01) |
| *B33Y 30/00* | (2015.01) |
| *B33Y 40/10* | (2020.01) |
| *B33Y 50/02* | (2015.01) |

(52) U.S. Cl.
CPC .............. *B22F 12/13* (2021.01); *B22F 12/52* (2021.01); *B22F 12/53* (2021.01); *B22F 12/63* (2021.01); *B22F 12/90* (2021.01); *B33Y 10/00* (2014.12); *B33Y 30/00* (2014.12); *B33Y 40/10* (2020.01); *B33Y 50/02* (2014.12); *B22F 2201/05* (2013.01); *B22F 2203/11* (2013.01); *B22F 2203/15* (2013.01)

(58) Field of Classification Search
CPC ..... B22F 2203/15; B33Y 10/00; B33Y 30/00; B33Y 50/02
See application file for complete search history.

(56) References Cited

U.S. PATENT DOCUMENTS

| | | |
|---|---|---|
| 2015/0266238 A1 | 9/2015 | Ederer et al. |
| 2015/0367415 A1 | 12/2015 | Buller et al. |
| 2017/0266878 A1 | 9/2017 | Furukawa et al. |
| 2018/0120260 A1 | 5/2018 | Goldfine et al. |
| 2019/0024926 A1 | 1/2019 | Kim et al. |
| 2021/0387261 A1 | 12/2021 | Takeshita |

FOREIGN PATENT DOCUMENTS

| | | | | |
|---|---|---|---|---|
| WO | 2013079491 A1 | 6/2013 | | |
| WO | WO-2019239531 A1 * | 12/2019 | .......... | B23K 26/342 |

* cited by examiner

SYSTEMS AND METHODS FOR POWDER BED DENSITY MEASUREMENT AND CONTROL FOR ADDITIVE MANUFACTURING

CROSS-REFERENCE TO RELATED APPLICATION

This application is a Divisional of U.S. patent application Ser. No. 17/370,845 filed Jul. 8, 2021 and claims the benefit under 35 U.S.C. § 119(e) of U.S. Provisional Application No. 62/872,544 filed Jul. 9, 2020, all of which are herein incorporated by reference in their entirety.

TECHNICAL FIELD

Various aspects of the present disclosure relate generally to systems and methods for measuring and controlling powder bed density.

BACKGROUND OF THE DISCLOSURE

Powder bed three-dimensional fabrication is an additive manufacturing technique based on binding particles of a powder to form a three-dimensional object within the powder bed. Binder jetting is one type of powder bed three-dimensional fabrication. Binder jetting includes delivering powder, e.g., metal powder, to a print bed, spreading the powder into a layer, and depositing a binder material, e.g., a binder fluid, on top of the powder to bind the powder together. In some instances, each layer of powder may have a height of about 50-100 µm. The binder material is deposited in a pre-determined pattern (e.g., in a two-dimensional pattern or image that represents a single, cross-sectional shape, or "slice," of the three-dimensional object) to successive layers of powder in a powder bed such that the powder particles bind to one another where the binder material is located to form a three-dimensional green part. In the context of binder jet printing of three-dimensional metal objects, a three-dimensional green part may be formed by printing as described above, and may then be processed further into a finished three-dimensional metal part. For example, excess, unbound metal powder may be removed from the powder bed. Then, the three-dimensional green part may be heated in a furnace to remove the binder material or to sinter the part to bind the particles together to form the final, three-dimensional part. The three-dimensional green part may be sintered to densify the part to full density (i.e. to remove void spaces within the part) or to lightly bond the particles without substantial removal of void space. For example, during sintering, the part may shrink by 10-30%.

It is desirable to have the powder in the powder bed filled to a high density (i.e., tighter packing of the powder particles) as this may facilitate a higher green density of the part, resulting in lower shrinkage of the part during the sintering process as there would be less void space to remove in the green part during densification. Moreover, higher density packing of the powder particles in the print bed may lead to better mechanical interlocking of particles within the green part, which may allow for use of lower sintering temperatures and may reduce slumping (i.e., deformation due to gravity) during the sintering process. There is also a need for the powder bed and green part to have a more uniform density to allow for more uniform part shrinkage and to reduce warping of the part during the sintering process. Variation in density in the green part may result in non-uniform shrinkage during the sintering process, which may cause parts to warp or crack, or may cause variation in the resulting dimensions of parts, leading to dimensional inaccuracy. While the powder density of green parts is critical in sintering-based applications such as binder jetting, the same considerations are typically not as important for melting-based additive manufacturing operations. For example, during Laser Powder Bed Fusion, the powder is melted and solidifies to nearly full density during the process, so the powder density has no or minimal impact on final part density and properties.

There are currently a variety of ways to evaluate variability in the powder bed. However, the conventional methods may be either destructive to the powder bed or take longer than desired to obtain a result. For example, one method is to lay down a powder bed and then press a sharp-edged tool such as a thin-walled tube into a column of powder to "cookie-cutter" a volume of powder. The surrounding powder is removed, and the volume of powder contained within the tool is collected and weighed. Density is calculated by dividing the mass of the collected powder by the volume of the captured powder, i.e. the area inside the tube x the powder column height. The captured powder may also be examined by a particle size analyzer to determine if the particle size distribution (PSD) is different in one region of the powder bed from another. A limitation of this method is that it may damage the powder bed and therefore cannot be used as a quality assurance tool when printing. Also, spatial resolution is limited by the size of the coring tool and how closely the cores may be taken, as the act of pressing a coring tool into the powder disturbs the surrounding powder.

Another method currently used to evaluate powder bed density is to print parts, cure the binder, and de-powder to obtain the parts in the "brown" state (powder held together by binder but not yet sintered). The mass and volume of the part are determined, and density is calculated by dividing the weight of the part by its volume. This method is undesirable because it may take at least a day to get a result. Also, this method usually requires the printing of simple geometric shapes such as cylinders or square volumes to simplify measurement of the part dimensions for volume calculation. Some of the print bed volume may be allocated for these samples, reducing the volume available for other parts.

A third method used is to print parts, cure, de-powder, and sinter. Sintered density may be calculated by dividing the part's mass by its volume or may be directly measured by the Archimedes method or by pycnometry. Nonuniformities in shrinkage, such as warping and divots, can be detected as deviations from the predicted shape of the part. This method is undesirable because it may take multiple days to get a result. Also, it is difficult to know whether warping is caused by powder bed nonuniformities or problems with sintering.

The systems and methods of the current disclosure may rectify one or more of the deficiencies described above, or may address other aspects of the prior art.

SUMMARY

Examples of the present disclosure relate to, among other things, systems and methods for measuring the density of the powder bed or green parts when forming three-dimensional objects using additive manufacturing. Some embodiments are also drawn to controlling parameters of the formation process based on the density measurements. Each of the examples disclosed herein may include one or more of the features described in connection with any of the other disclosed examples.

The present disclosure includes systems and methods for forming a three-dimensional object using additive manufacturing. One method includes depositing a first amount of powder material onto a powder print bed of a printing system, spreading the first amount of powder material across the powder print bed to form a first layer, measuring a density of powder material within the powder print bed, and adjusting a parameter of the printing system based on the measured density of the powder material within the powder print bed.

According to some aspects, there is provided an additive manufacturing system for forming a three-dimensional object, the system including: a powder supply configured to deposit powder material onto a powder print bed, a spreader configured to spread the deposited powder material to form a layer, a powder density measuring apparatus configured to measure a density of one or more accumulated powder material layers on the powder print bed, and a controller configured to adjust a parameter of the system based on the measured density of the one or more accumulated powder material layers.

Both the foregoing general description and the following detailed description are exemplary and explanatory only and are not restrictive of the features, as claimed. As used herein, the terms "comprises," "comprising," "including," "having," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. In this disclosure, unless stated otherwise, relative terms, such as, for example, "about," "substantially," and "approximately" are used to indicate a possible variation of +/−10% in the stated value. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. Moreover, in the claims, values, limits, or ranges of various claimed elements or features means the stated value, limit, or range +/−10%. The terms "object," "part," and "component," as used herein, are intended to encompass any object fabricated using the additive manufacturing techniques described herein.

Although embodiments of the disclosure are described in reference to binder jet printing systems for forming metal objects, embodiments of the disclosure may also be applicable to other binder jet applications (e.g., ceramic or plastic binder jetting), in laser-based additive manufacturing (e.g., direct metal laser sintering (DMLS)), or any other suitable additive manufacturing method in which an object is formed in a powder bed or in which powder is spread layer-by-layer.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure.

DETAILED DESCRIPTION

Embodiments of the present disclosure include systems and methods for measuring or controlling powder bed density during three-dimensional printing, e.g., during or after spreading powder on a powder print bed. Reference now will be made in detail to examples of the present disclosure described above and illustrated in the accompanying drawings. Wherever possible, the same reference numbers will be used throughout the drawings to refer to the same or like parts.

The ability to rapidly map powder bed density and uniformity greatly improves quality control of the printing process. Non-uniformities may be quickly detected, and feedstock or equipment adjustments can be made expediently, reducing defects and lowering costs. The types of process conditions that may be detected by this method include, but are not limited to, variations in the powder, powder feeder, powder spreader, build box, print head, or other subcomponents of the printer. In some embodiments, optimization of the printing process is enhanced, thereby enabling engineers and machine operators to examine the effects that different machine components and process settings have on the powder bed.

Figure 1A:
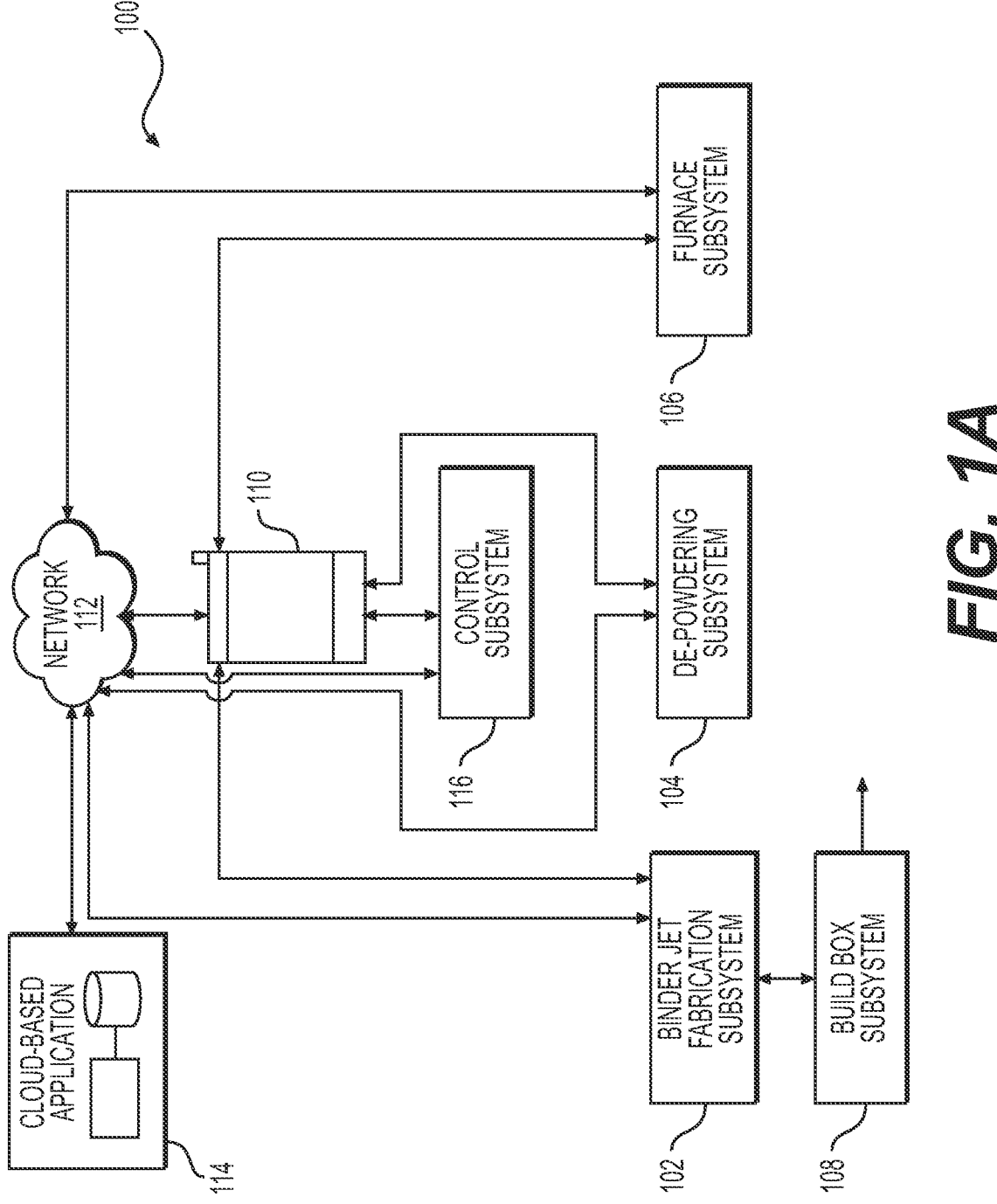
FIG. 1A is a block diagram of an additive manufacturing system according to some embodiments of the disclosure.

FIG. 1A illustrates an exemplary system 100 for forming a printed object, according to an embodiment of the present disclosure. System 100 may include a printer, for example, a binder jet fabrication subsystem 102, and a treatment site(s), for example, a de-powdering subsystem 104 and a sintering furnace subsystem 106. Binder jet fabrication subsystem 102 may be used to form an object from a build material, for example, by delivering successive layers of build material and binder material to a build plate. As shown in FIG. 1A, a build box subsystem 108 may be movable and may be selectively positioned in one or more of binder jet fabrication subsystem 102, de-powdering subsystem 104, and sintering furnace subsystem 106. For example, build box subsystem 108 may be coupled or couplable to a movable assembly. Alternatively, a conveyor (not shown) may help transport the object between portions of system 100.

The build material may be a bulk metallic powder delivered and spread in successive layers. The binder material may be, for example, a polymeric liquid that may be deposited onto and may be absorbed into layers of the build material. One or more of binder jet fabrication subsystem 102, de-powdering subsystem 104, and sintering furnace subsystem 106 may include a shaping station to shape the printed object and a debinding station to treat the printed object to remove a binder material from the build material. Furnace subsystem 106 may heat or sinter the build material of the printed object. System 100 may also include a user interface 110, which may be operatively coupled to one or more components, for example, to binder jet fabrication subsystem 102, de-powdering subsystem 104, and sintering furnace subsystem 106, etc. In some embodiments, user interface 110 may be a remote device (e.g., a computer, a tablet, a smartphone, a laptop, etc.). User interface 110 may be wired or wirelessly connected to one or more of binder jet fabrication subsystem 102, de-powdering subsystem 104, and sintering furnace subsystem 106. System 100 may also include a control subsystem 116, which may be included in user interface 110, or may be a separate element.

Binder jet fabrication subsystem 102, de-powdering subsystem 104, sintering furnace subsystem 106, user interface 110, or control subsystem 116 may each be connected to the other components of system 100 directly or via a network 112. Network 112 may include the Internet and may provide communication through one or more computers, servers, or handheld mobile devices, including the various components of system 100. For example, network 112 may provide a data transfer connection between the various components, permitting transfer of data including, e.g., geometries, the printing material, one or more support or support interface details, binder materials, heating or sintering times and temperatures, etc., for one or more parts or one or more parts to be printed.

Moreover, network 112 may be connected to a cloud-based application 114, which may also provide a data transfer connection between the various components and cloud-based application 114 in order to provide a data transfer connection, as discussed above. Cloud-based application 114 may be accessed by a user in a web browser, and may include various instructions, applications, algorithms, methods of operation, preferences, historical data, etc., for forming the part or object to be printed based on the various user-input details. Alternatively or additionally, the various instructions, applications, algorithms, methods of operation, preferences, historical data, etc., may be stored locally on a local server (not shown) or in a storage or processing device within or operably coupled to one or more of binder jet fabrication subsystem 102, de-powdering subsystem 104, sintering furnace subsystem 106, user interface 110, or control subsystem 116. In this aspect, binder jet fabrication subsystem 102, de-powdering subsystem 104, sintering furnace subsystem 106, user interface 110, or control subsystem 116 may be disconnected from the Internet or other networks, which may increase security protections for the components of system 100. In either aspect, an additional controller (not shown) may be associated with one or more of binder jet fabrication subsystem 102, de-powdering subsystem 104, and sintering furnace subsystem 106, etc., and may be configured to receive instructions to form the printed object and to instruct one or more components of system 100 to form the printed object.

Figure 1B:
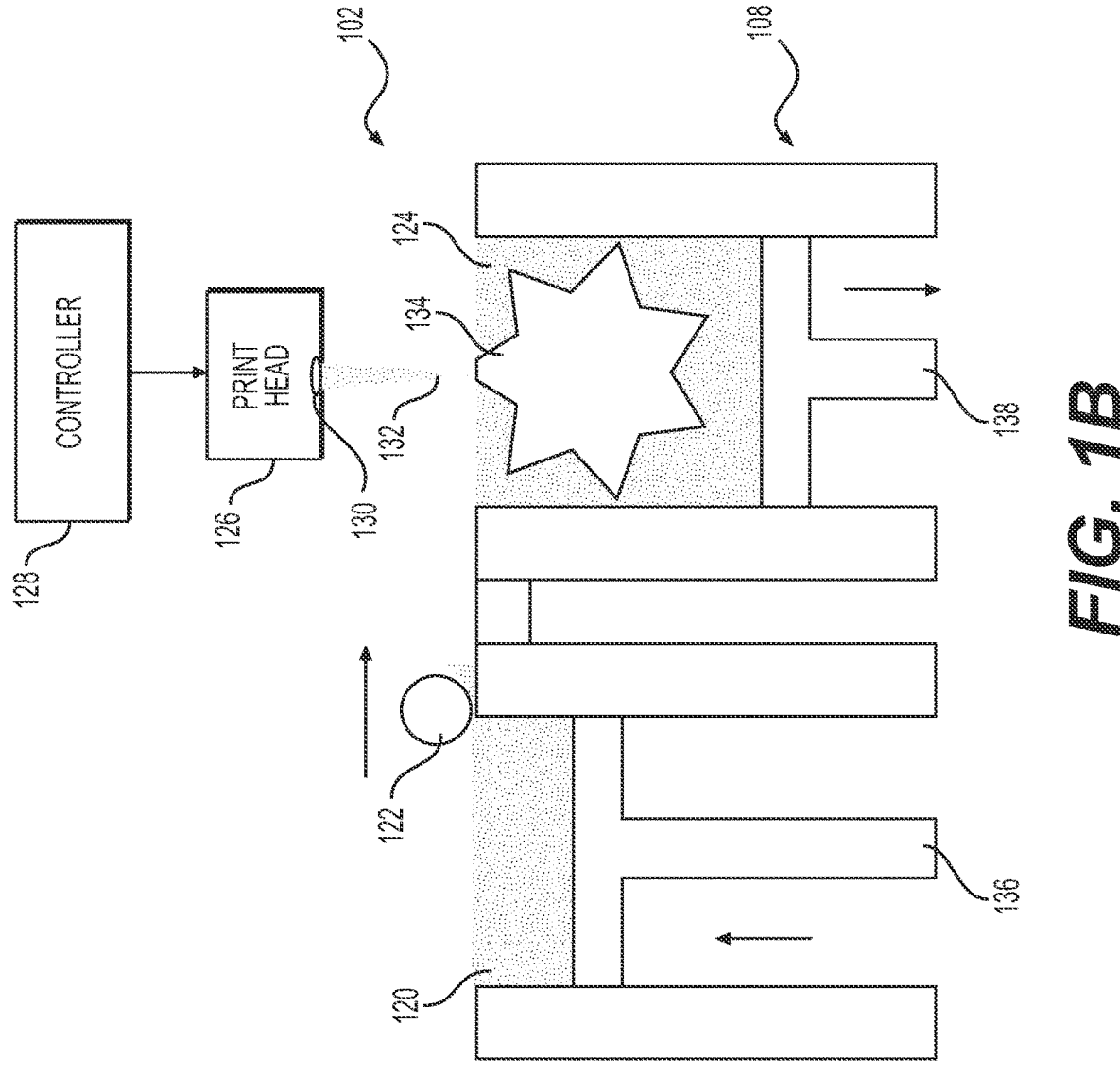
FIG. 1B illustrates an exemplary printing subsystem of the system of FIG. 1A.

FIG. 1B illustrates an exemplary binder jet fabrication subsystem 102 operating in conjunction with build box subsystem 108. Binder jet fabrication subsystem 102 may include a powder supply 120, a spreader 122 (e.g., a roller) configured to be movable across powder bed 124 of build box subsystem 108, a print head 126 movable across powder bed 124, and a controller 128 in electrical communication (e.g., wireless, wired, Bluetooth, etc.) with print head 126. Powder bed 124 may comprise powder particles, for example, micro-particles of a metal, micro-particles of two or more metals, or a composite of one or more metals and other materials.

Spreader 122 may be movable across powder bed 124 to spread a layer of powder, from powder supply 120, across powder bed 124. Print head 126 may comprise a discharge orifice 130 and, in certain implementations, may be actuated to dispense a binder material 132 (e.g., through delivery of an electric current to a piezoelectric element in mechanical communication with binder material 132) through discharge orifice 130 to the layer of powder spread across powder bed 124. In some embodiments, the binder material 132 may be one or more fluids configured to bind together powder particles.

In operation, controller 128 may actuate print head 126 to deliver binder material 132 from print head 126 to each layer of the powder in a pre-determined two-dimensional pattern, as print head 126 moves across powder bed 124. In embodiments, the movement of print head 126, and the actuation of print head 126 to deliver binder material 132, may be coordinated with movement of spreader 122 across print bed 124. For example, spreader 122 may spread a layer of the powder across print bed 124, and print head 126 may deliver the binder in a pre-determined, two-dimensional pattern, to the layer of the powder spread across print bed 124, to form a layer of one or more three-dimensional objects 134. These steps may be repeated (e.g., with the pre-determined two-dimensional pattern for each respective layer) in sequence to form subsequent layers until, ultimately, the one or more three-dimensional objects 134 are formed in powder bed 124.

Although the example embodiment depicted in FIG. 1B depicts a single object 134 being printed, it should be understood that the powder print bed 124 may include more than one object 134 in embodiments in which more than one object 134 is printed at once. Further, the powder print bed 124 may be delineated into two or more layers, stacked vertically, with one or more objects disposed within each layer.

An example binder jet fabrication subsystem 102 may comprise a powder supply actuator mechanism 136 that elevates powder supply 120 as spreader 122 layers the powder across print bed 124. Similarly, build box subsystem 108 may comprise a build box actuator mechanism 138 that lowers powder bed 124 incrementally as each layer of powder is distributed across powder bed 124.

In another example embodiment, layers of powder may be applied to powder print bed 124 by a hopper followed by a compaction roller. The hopper may move across powder print bed 124, depositing powder along the way. The compaction roller may be configured to follow the hopper, spreading the deposited powder to form a layer of powder.

Figure 1C:
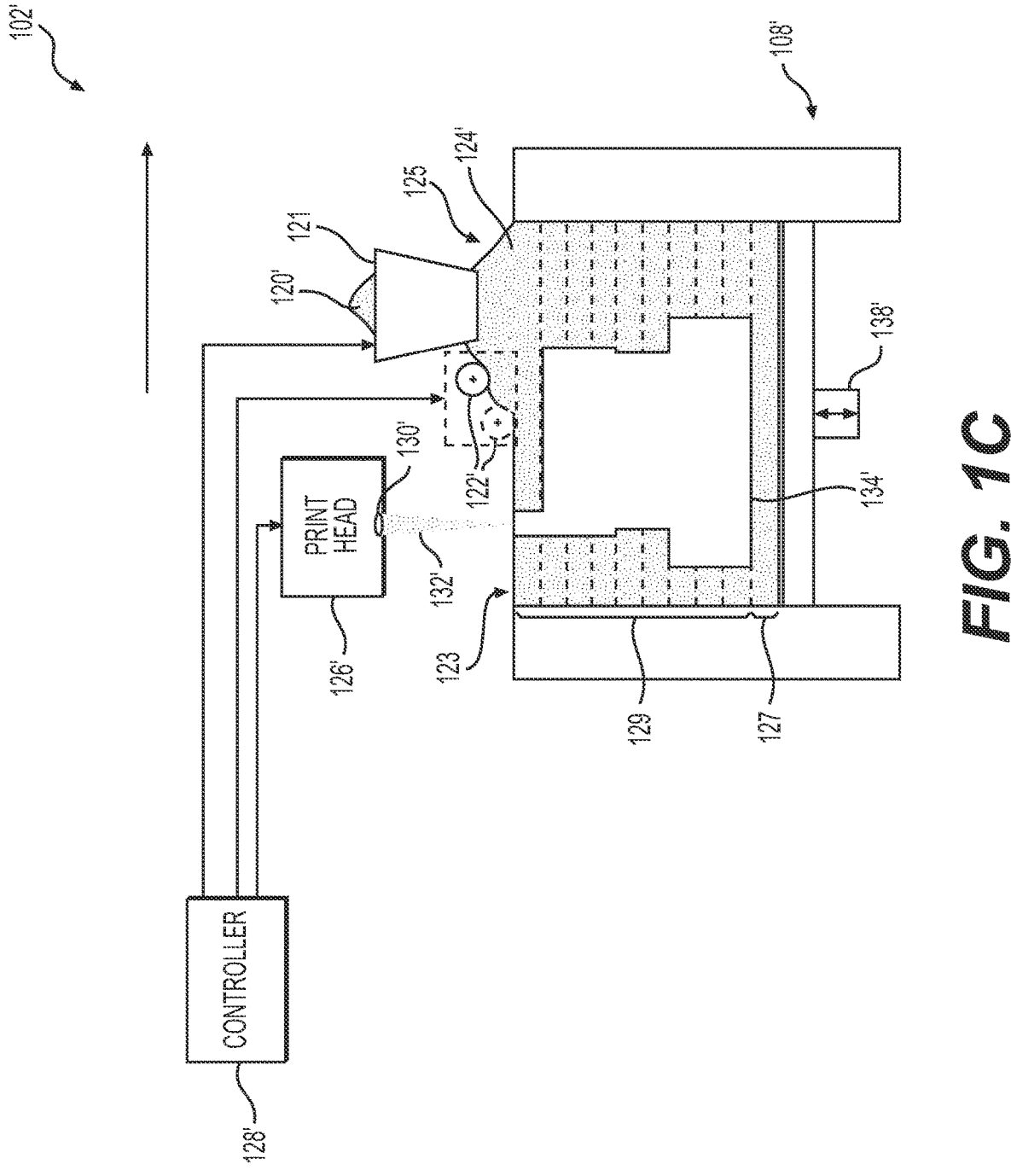
FIG. 1C illustrates another exemplary printing subsystem of the system of FIG. 1A.

For example, FIG. 1C illustrates another binder jet fabrication subsystem 102' operating in conjunction with a build box subsystem 108'. In this aspect, binder jet fabrication subsystem 102' may include a powder supply 120' in a metering apparatus, for example, a hopper 121. Binder jet subsystem 102' may also include one or more spreaders 122' (e.g., one or more rollers) configured to be movable across powder bed 124' of build box subsystem 108', a print head 126' movable across powder bed 124', and a controller 128' in electrical communication (e.g., wireless, wired, Bluetooth, etc.) with one or more of hopper 121, spreaders 122', and print head 126'. Powder bed 124' may comprise powder particles, for example, micro-particles of a metal, micro-particles of two or more metals, or a composite of one or more metals and other materials.

Hopper 121 may be any suitable metering apparatus configured to meter or deliver powder from powder supply 120' onto a top surface 123 of powder bed 124'. Hopper 121 may be movable across powder bed 124' to deliver powder from powder supply 120' onto top surface 123. The delivered powder may form a pile 125 of powder on top surface 123.

The one or more spreaders 122' may be movable across powder bed 124' downstream of hopper 121 to spread powder, e.g., from pile 125, across powder bed 124. The one or more spreaders 122' may also compact the powder on top surface 123. In either aspect, the one or more spreaders 122' may form a layer 127 of powder. The aforementioned powder delivery and spreading steps may be successively performed in order to form a plurality of layers 129 of powder. Additionally, although two spreaders 122' are shown in FIG. 1C, binder jet fabrication subsystem 102' may include one, three, four, etc. spreaders 122'.

Print head 126' may comprise one or more discharge orifices 130' and, in certain implementations, may be actuated to dispense a binder material FIG. 1B, the (e.g., through delivery of an electric current to a piezoelectric element in mechanical communication with binder material 132') through discharge orifice 130' to the layer of powder spread across powder bed 124'. In some embodiments, the binder material 132' may be one or more fluids configured to bind together powder particles.

In operation, controller 128' may actuate print head 126' to deliver binder material 132' from print head 126' to each layer 127 of the powder in a pre-determined two-dimensional pattern, as print head 126' moves across powder bed 124'. As shown in FIG. 1C, controller 128' may be in communication with hopper 121 or the one or more spreaders 122' as well, for example, to actuate the movement of hopper 121 and the one or more spreaders 122' across powder bed 124'. Additionally, controller 128' may control the metering or delivery of powder by hopper 121 from powder supply 120 to top surface 123 of powder bed 124'. In embodiments, the movement of print head 126', and the actuation of print head 126' to deliver binder material 132', may be coordinated with movement of hopper 121 and the one or more spreaders 122' across print bed 124'. For example, hopper 121 may deliver powder to print bed 124, and spreader 122' may spread a layer of the powder across print bed 124. Then, print head 126 may deliver the binder in a pre-determined, two-dimensional pattern, to the layer of the powder spread across print bed 124', to form a layer of one or more three-dimensional objects 134'. These steps may be repeated (e.g., with the pre-determined two-dimensional pattern for each respective layer) in sequence to form subsequent layers until, ultimately, the one or more three-dimensional objects 134' are formed in powder bed 124'.

Although the example embodiment depicted in FIG. 1C depicts a single object 134' being printed, it should be understood that the powder print bed 124' may include more than one object 134' in embodiments in which more than one object 134' is printed at once. Further, the powder print bed 124' may be delineated into two or more layers 127, stacked vertically, with one or more objects disposed within each layer.

As in FIG. 1B, build box subsystem 108' may comprise a build box actuator mechanism 138' that lowers powder bed 124' incrementally as each layer 127 of powder is distributed across powder bed 124'. Accordingly, hopper 121, the one or more spreaders 122', and print head 126' may traverse build box subsystem 108' at a pre-determined height, and build box actuator mechanism 138' may lower powder bed 124 to form object 134'.

Although not shown, binder jet fabrication subsystems 102, 102' may include a coupling interface that may facilitate the coupling or uncoupling of the build box subsystems 108, 108' with the binder jet fabrication subsystems 102, 102', respectively. The coupling interface may comprise one or more of (i) a mechanical aspect that provides for physical engagement, or (ii) an electrical aspect that supports electrical communication between the build box subsystem 108, 108' to the binder jet fabrication subsystem 102, 102'.

In some embodiments, non-uniformity of powder packing density in the powder bed 124, 124' may result from non-uniform spreading or packing during the powder spreading in the powder bed 124, 124' or the printed object 134, 134', as described above with reference to FIGS. 1B-1C. In such embodiments, the variation of density may result in differential shrinkage of the printed object 134, 134' during subsequent processing, e.g., sintering, which may cause warping or cracking in the part. As such, a more uniform and more consistent density in the powder bed and printed object may be beneficial for predicting shrinkage and enabling tighter tolerances for a geometry of the desired part. However, it may be difficult to control powder bed density, in part because of the difficulty of powder bed density measurement.

In an aspect, there are provided methods and systems for measuring the density of the powder inside the powder bed 124, 124' or the printed object 134, 134' during or after printing, e.g., during or after spreading the powder. To assist with measurements, the binder jet fabrication subsystem 102, 102' may further comprise one or more powder bed density sensors configured to directly measure the density of the powder bed 124, 124' or the printed object 134, 134', while in other aspects, indirect measurements may be taken.

In some embodiments, the one or more powder bed density sensors may comprise one or more load cells configured to measure the density of the powder bed 124, 124'. In such embodiments, the one or more load cells may be operably coupled to the powder bed 124, 124' for a direct measurement of the powder density. In some embodiments, one load cell may be operably coupled to the powder bed 124, 124' and may be configured to measure the weight of the entire powder bed 124, 124'. For example, the load cell may measure the weight of the powder bed 124, 124' after each successive layer of powder is deposited, or after a group of powder layers has been deposited in the powder bed 124, 124'. In some embodiments, the volume per layer of powder may be preconfigured or measured. The volume per layer of powder and the measured weight of the powder bed 124, 124' may be utilized in combination to calculate the density of the powder bed 124, 124' by dividing the mass of the powder bed by the volume of the powder. If the weight of each layer or a group of layers is measured (e.g., by subtracting a weight measurement of the powder bed 124, 124' before the addition of that layer (or that group of layers)

to the powder bed from a weight measurement of the powder bed 124, 124' after the addition of that layer (or group of layers) to the powder bed), and the volume of powder material deposited in that layer (or group of layers) is known or measured, then the density of that layer (or group of layers) in the powder bed 124, 124' may be calculated. In other aspects, a density of the powder bed 124, 124' may be measured generally by measuring the weight of the powder bed 124, 124' as a whole (and subtracting the weight of the build box, if included in the weight of the powder bed) and either measuring or knowing the volume of powder in the powder bed 124, 124'.

In some embodiments, multiple load cells may be operably coupled to the powder bed 124, 124' for direct measurement of the powder density. In such embodiments, one load cell may be operably coupled to each corner of the powder bed 124, 124'. Each of the multiple load cells may be configured to measure a fraction of the weight of the powder bed 124, 124' and, if also measured, the weight of the build box may be subtracted from the weight of the powder bed to obtain the weight of the powder within the powder bed. This may allow for the measurement of the mass distribution. In some embodiments, the volume per layer of powder may be preconfigured or measured. For example, it may be known how much volume is deposited in each layer of the powder bed, or it may be known how many layers of powder have been deposited in the powder bed 124, 124'. Alternatively or additionally, sensors to detect the volume of the powder bed may also be included. The volume per layer of powder and the measured weight may be utilized to calculate the density of the powder bed 124, 124' by dividing the mass of the powder bed by the volume of the powder. In some embodiments, the calculated density may be utilized to create a time series (or trend) of the mass/density of the powder bed 124, 124' during printing.

Although one or four load cells are described herein, it is contemplated that two, three, or more than four load cells may be included to measure the weight of the powder bed 124, 124'.

Figure 2:
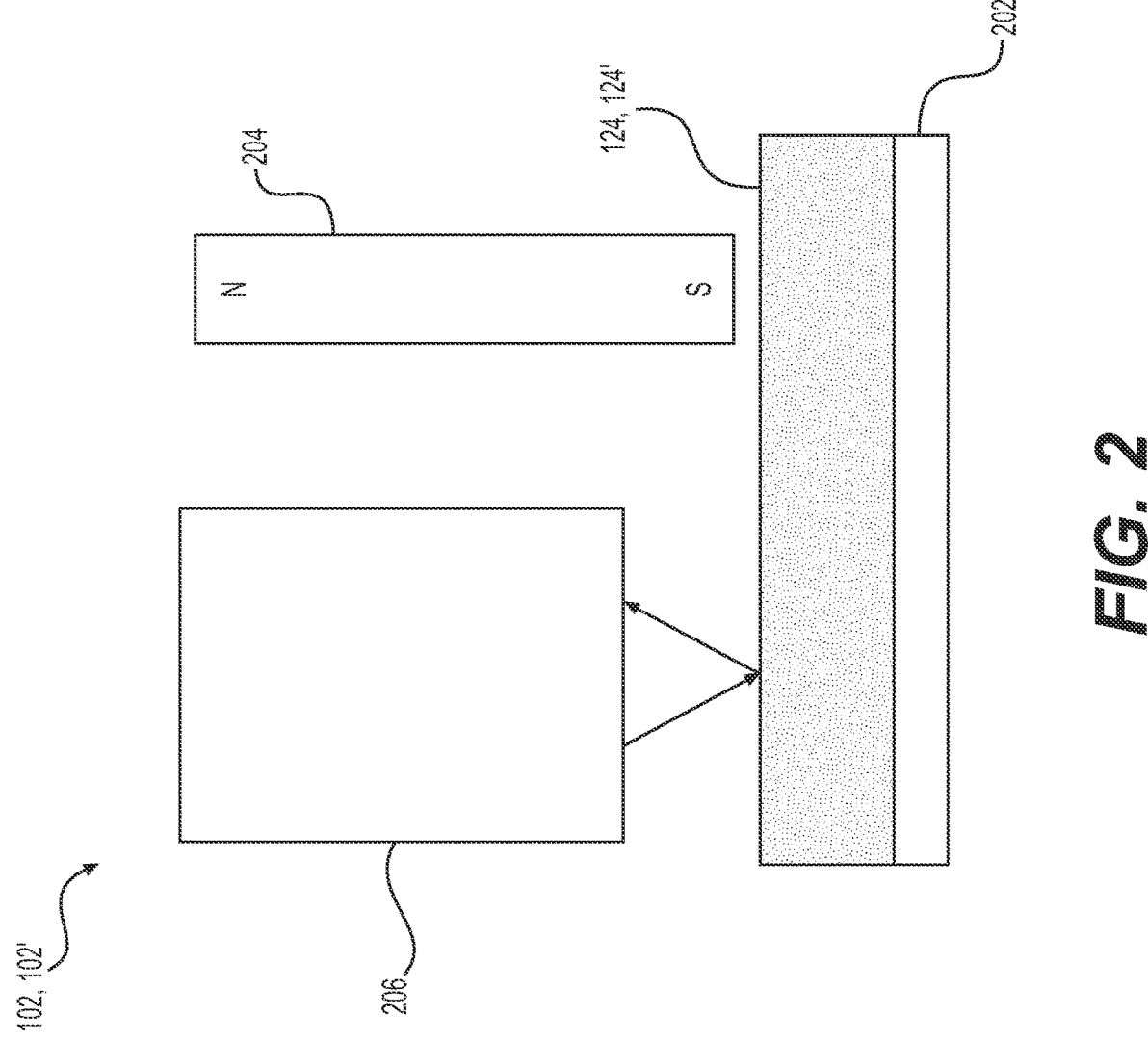
FIG. 2 illustrates an exemplary printing subsystem according to some embodiments of the disclosure.

In some embodiments, the one or more powder bed density sensors may include one or more magnets configured to measure the density of the powder bed 124, 124'. In such embodiments, a force generated by a magnet positioned in proximity to the powder bed 124, 124' may be measured and utilized to calculate the density of the powder inside the powder bed 124, 124'. For example, as shown in FIG. 2, the binder jet fabrication subsystem 102, 102' may comprise a displacement transducer 206 and a magnet 204 positioned above a top layer of the powder bed 124, 124' according to some embodiments. The powder bed 124, 124' may be positioned on a surface of a base plate 202, as shown in FIG. 2. In some embodiments, the base plate 202 may be a part of the build box or build box actuator mechanism 138, 138'. The magnet 204 may be positioned in proximity to the top layer of the powder bed 124, 124' such that a force generated by the magnet 204 is measured with a load cell. In some embodiments, a force on the magnet 204 may be measured to determine a volume fraction of the powder bed 124, 124'. The force may depend on the following non-limiting factors: (1) powder density, (2) magnetic permeability of the powder material, (3) a distance between the magnet and the powder, or (4) a distance from the magnet 204 to the base plate 202 (if it is conductive). A powder bed 124, 124' having a higher packing density may cause a stronger attractive force on the magnet 204, allowing for a correlation to be made between magnetic force and powder density.

Figure 3A:
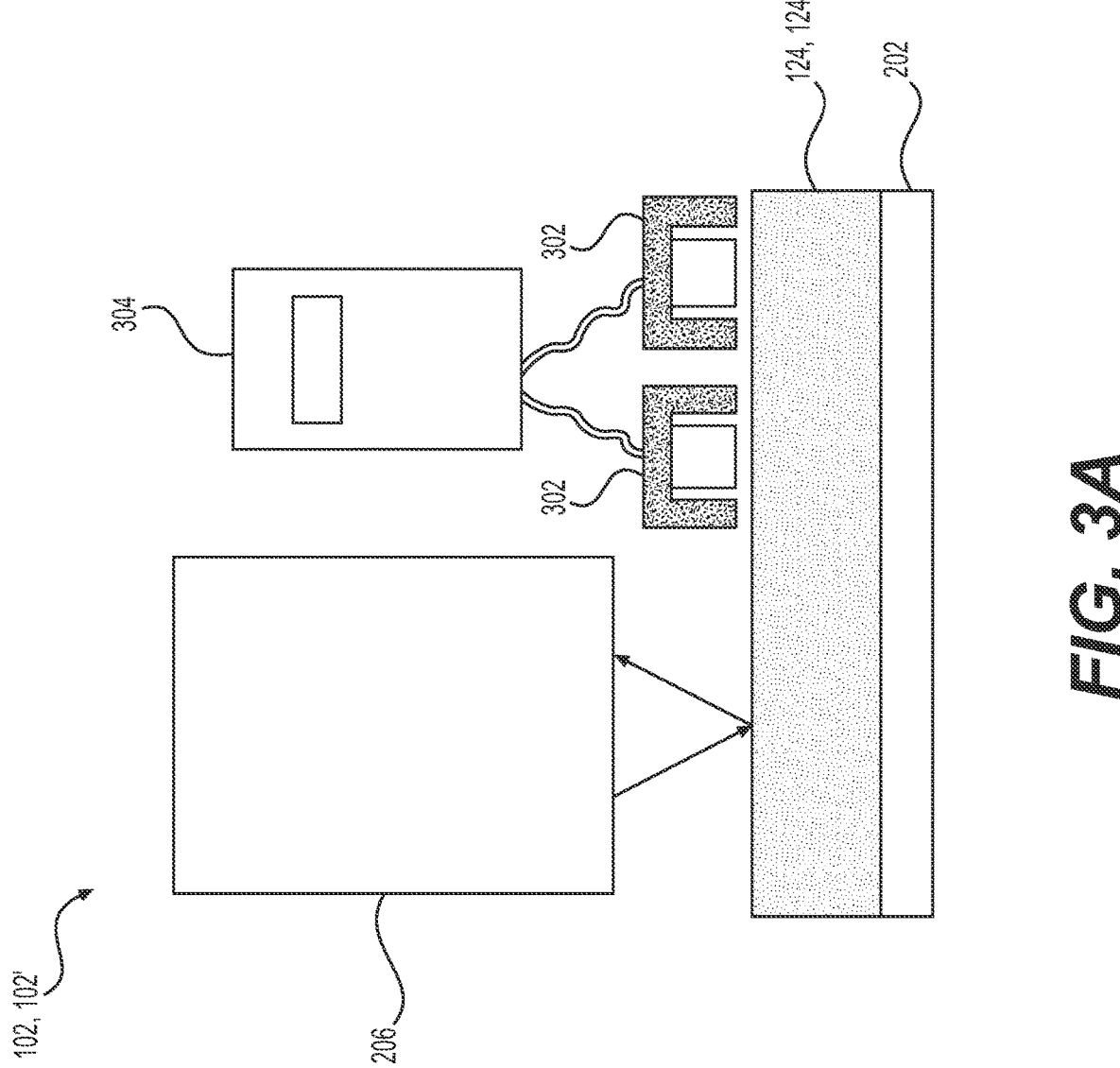
FIG. 3A illustrates an exemplary printing subsystem according to some embodiments of the disclosure.
Figure 3B:
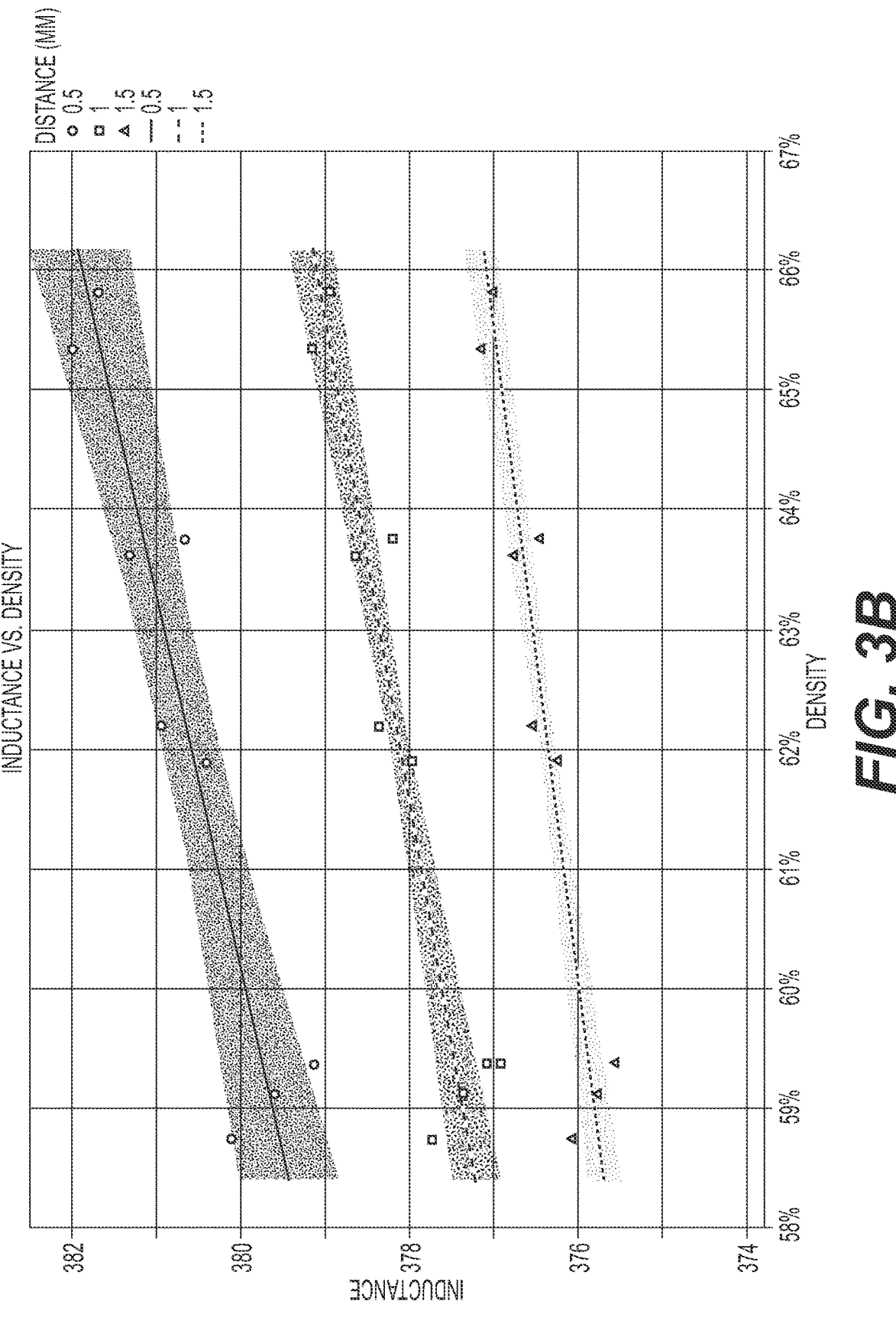
FIG. 3B graphically illustrates a correlation between inductive measurements and powder density according to some embodiments of the disclosure.

In some embodiments, the density of the powder inside the powder bed 124, 124' may be measured based on a measurement of the magnetic or electrical properties of the powder bed 124, 124'. For example, inductance measurements may be utilized to measure the powder density of the powder bed 124, 124' (referred to as inductive powder bed density measurement). In such embodiments, one or more powder bed density sensors may comprise a RLC (resistance, inductance, capacitance) meter 304, and one or more pot cores 302 having a coil configured to measure the density of the powder bed 124, 124'. As shown in FIG. 3A, the binder jet fabrication subsystem 102, 102' may comprise the displacement transducer 206 (e.g., a laser transducer), the RLC meter 304, and the one or more pot cores 302 having a coil according to some embodiments. In some embodiments, the inductance may depend on one or more of the following non-limiting factors: (1) powder density, (2) magnetic permeability of the powder material, (3) a distance between a sensor and the powder, or (4) a distance to the base plate 202. FIG. 3B illustrates a correlation between inductive measurements and the powder density according to some embodiments. Accordingly, if factors (2), (3), and (4) are known, then it may be possible to measure the powder density of the powder bed 124, 124' using the RLC meter 304.

In some embodiments, alternative signal processing methods may be utilized with reference to inductive powder bed density measurement. For example, a balanced inductance bridge may be used instead of the RLC meter 304 to measure inductance. In some embodiments, a five or six digit measurement resolution may be desirable for an inductance meter in order to obtain a 0.1% resolution on volume fraction with stainless steel 316, which has low magnetic permeability. In such embodiments, it may be more cost effective or accurate to utilize a balanced inductance bridge instead of the RLC meter 304 which could take the place of RLC meter 304 in FIG. 3A.

As another example, the coil of the one or more pot cores 302 may be oscillated up and down while passing a DC current through the coil. Because the reluctance of a circuit varies with standoff, the oscillation may produce an AC signal that would increase with the DC passing through the coil and the velocity with which the coil is moving. The reluctance change with standoff may be higher when a magnetic permeability of the powder is higher. In such instances, this measurement may be sensitive to volume fraction.

In some embodiments, an inductive sensor is placed typically 0.5-2.0 mm above the surface of a powder, where the powder has been spread in a smooth layer across an area. The sensor may include a drive loop that is driven at frequencies typically in the range of 50 kHz-10 MHz, and the drive loop may produce a magnetic field. Sensing elements in proximity to the drive loop may be secondary conductive loops that produce a voltage in response to the magnetic field that passes within the loops. When the sensor is in proximity to a magnetically permeable material, such as powders in the print bed, the magnetic fields are perturbed. The signal produced by the sensing elements may thus related to the permeability of the powder bed. Spot measurements may be taken of the powder's permeability, or by scanning the sensor across the area of the print bed a map of permeability may be created. The technique relies on the powder being magnetically permeable, and is applicable to materials such as iron and iron alloys, steels, stainless steels, nickel and nickel alloys, cobalt and cobalt alloys, and other magnetically permeable materials. The technique also relies on the bulk permeability of the powder bed being governed by the local packing density of the powder. In regions where the powder is less dense the bulk magnetic permeability of that region may be less. Conversely, where the packing density of the powder is greater, the bulk magnetic permeability may be greater. For metal powders used in printing, the density of the powder in the powder bed may commonly be in the range of 55-70% of the full density of the powder, with the remaining 30-45% of the volume being gas.

The magnetic permeability of the powder may be affected by how it was fabricated. Metal powders used as additive manufacturing feedstock are commonly fabricated by gas or water atomization, which produces powders that have a distribution of particle sizes. The larger and smaller particles may solidify at different rates within the atomization chamber causing their microstructures to be different, and this may result in the larger particles having a different magnetic permeability than the smaller particles. In the powder bed, an uneven distribution of larger and smaller particles may affect the bulk magnetic permeability of the powder bed. Thus along with differences in powder density, the inductive sensor technique may also detect differences in particle size distribution.

It may also be desirable to calibrate the density measurement apparatus for the magnetic permeability of a particular batch of metal powder. In one embodiment, a calibration may make use of a correction factor calculated by using the printing system to fabricate an article which can be measured after the printing and depowdering process, compared with the measured magnetic permeability during the printing process, and a correction factor or transfer function derived. In another embodiment, powder from a batch to be used in the printing system may be prepared for a calibration measurement, e.g. by tapping the powder in a cylinder whose volume and mass may be measured, and measuring a magnetic permeability of the powder prepared. From this, a correlation may be determined between the density and magnetic permeability for the given batch of powder.

The electrical conductivity of the powder may also affect the response of the inductive sensor. However, in the case of the powder materials listed previously there is typically poor conductivity between particles due to the high resistivity of the native oxide that coats each powder particle. For these materials the bulk powder is non-conductive, and thus there is no contribution of bulk conductivity to the sensor response. It is possible for eddy currents within each particle to affect sensor response. However, the materials listed above have a low enough conductivity (typically $1\text{-}14\times10^{\wedge}6$ S/m) and the particle size may be small enough (typically 1-40 μm) that the skin effect only results in eddy currents within the individual powder particles if the drive frequency is greater than about 20 MHz.

In some embodiments, the sensor response may be highly sensitive to the distance between the sensor and the powder, and the contributions to the sensor response from both the powder's permeability and the sensor-powder distance must be known. To compensate for the effect of sensor-powder distance, known as "lift-off," sensors may be employed. For example, sensors designed in a geometry that may be electromagnetically modeled may be used, and the sensor response may be modeled to simultaneously solve for both lift-off and the magnetic permeability of the powder. The sensors may be constructed with sensing elements at two different distances from the drive winding, enabling these two unknowns to be solved simultaneously. Alternatively, a separate sensor, such as a laser displacement sensor, may be used to determine the lift-off of the sensor from the powder surface. The lift-off determined in this manner may be used in conjunction with the measured inductance to calculate or estimate a density of a powder bed.

Sensors of various designs may be constructed to perform these measurements. For example, single point rosette-style sensors may be used for spot measurements of the powder, and may be scanned across an area to produce permeability and lift-off maps. A linear array-style sensor, where the sensing element pairs are aligned in a row, may cover a broader width in a single scan.

The embodiments described above may be applied various manners. For example, the described methods may be used to compare powder tap density vs. measured permeability, perform area scans of a printed block, provide area scans of powder that was tamped in regions and spread flat, or scans of other powder beds (such as an area where powder is distributed from).

In some embodiments, eddy current measurements may be utilized to measure the electrical properties of the powder bed 124, 124'.

Figure 4:
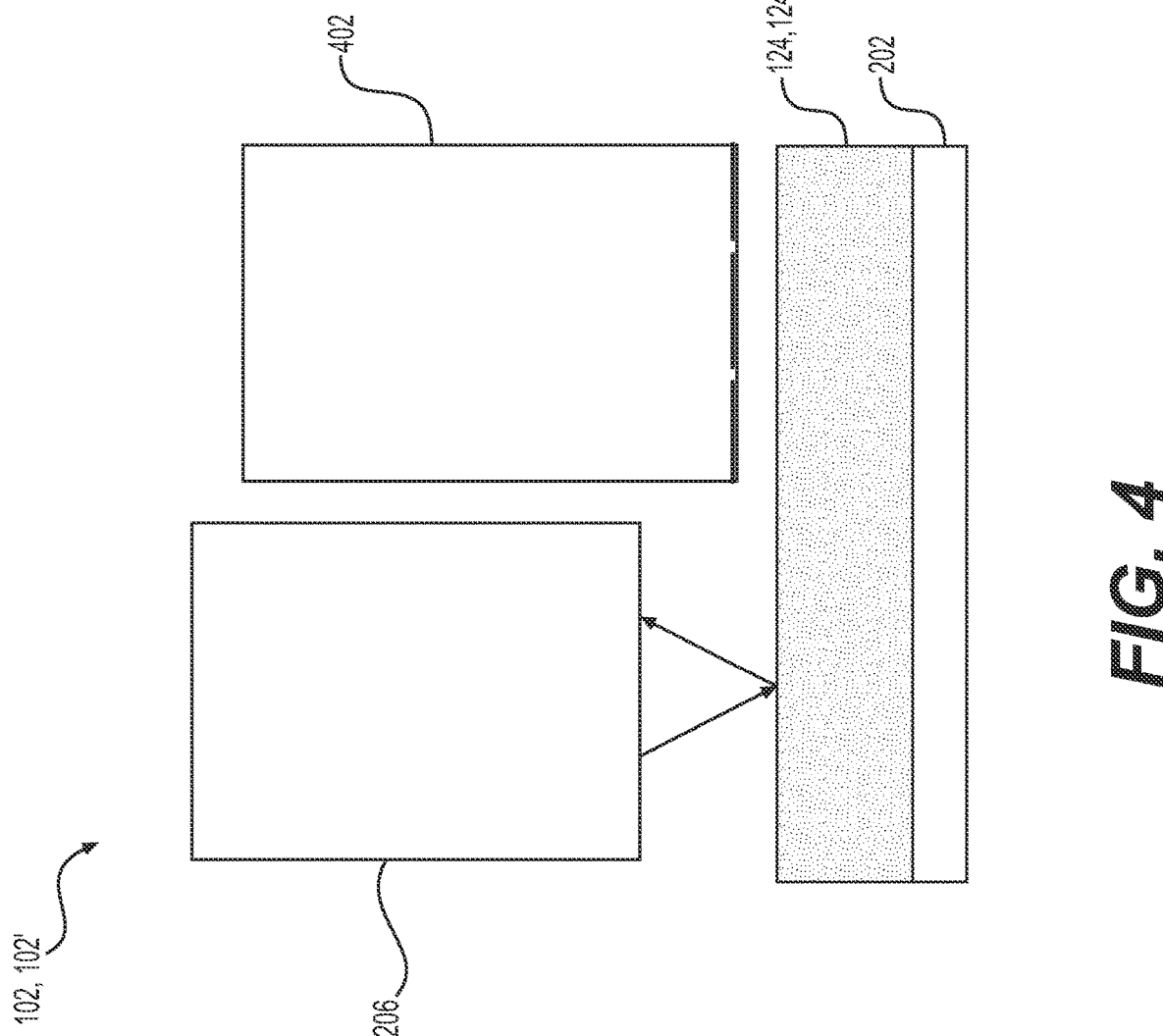
FIG. 4 illustrates an exemplary printing subsystem according to some embodiments of the disclosure.

Capacitance measurements may also be utilized to measure the powder density of the powder bed 124, 124' (referred to as capacitive powder bed density measurement). In such embodiments, the one or more powder bed density sensors may comprise a capacitance probe (also referred to as a capacitance meter) configured to measure the density of the powder bed 124, 124'. As shown in FIG. 4, the binder jet fabrication subsystem 102, 102' may include displacement transducer 206 and the capacitance probe 402. The capacitance of the powder bed may depend on one or more of the following non-limiting factors: (1) powder density, (2) a distance between a sensor and the powder, or (3) a distance to the base plate 202. Accordingly, if factors (2) and (3) are known, then it may be possible to measure the powder density of the powder bed 124, 124' using capacitance probe 402.

Figure 5:
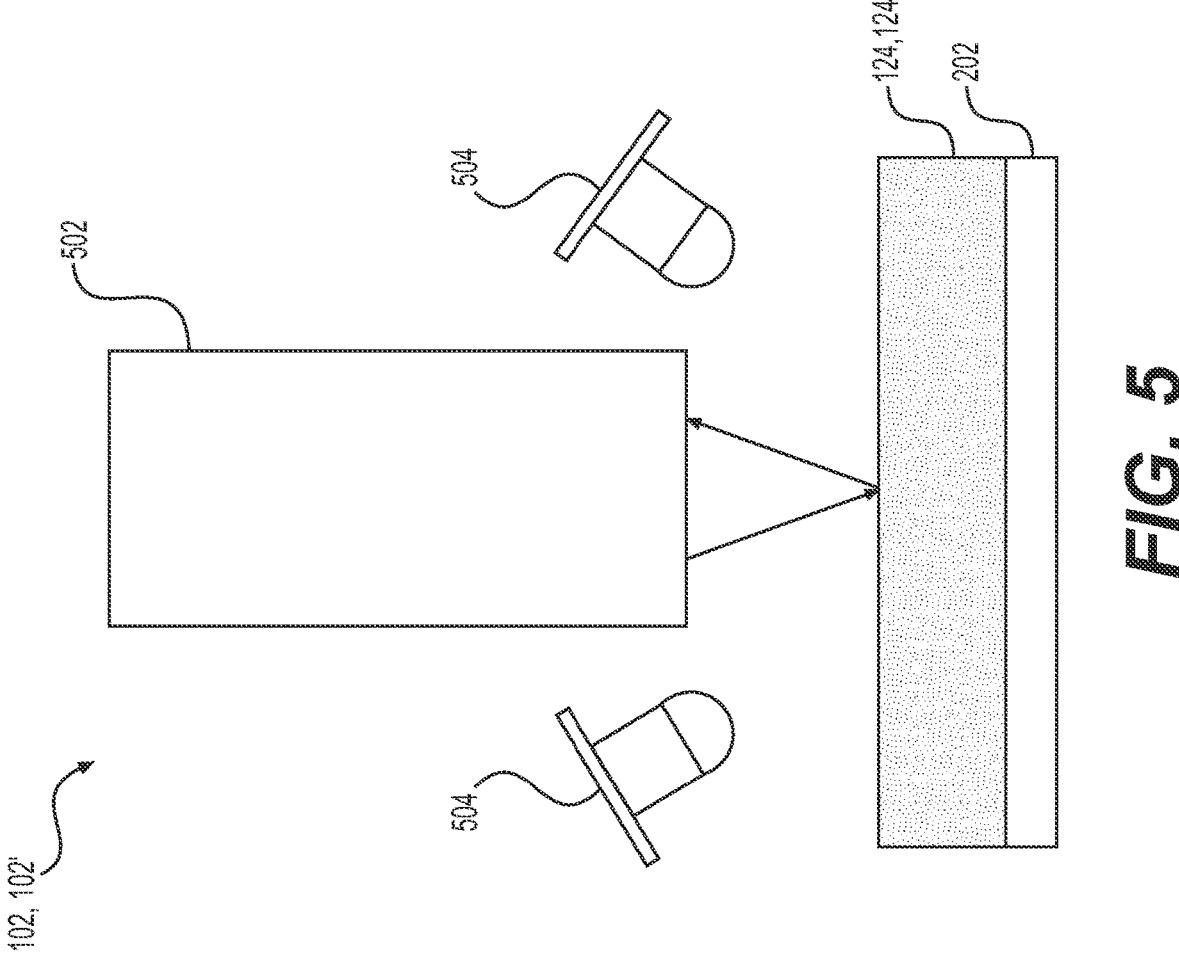
FIG. 5 illustrates an exemplary printing subsystem according to some embodiments of the disclosure.

In some embodiments, thermal measurements may be utilized to measure the powder density of the powder bed 124, 124' (referred to as thermal conductivity powder density measurement). In such embodiments, one or more powder bed density sensors may include an array of one or more heating sources and one or more temperature sensors to measure the density of the powder bed 124, 124'. As shown in FIG. 5, the binder jet fabrication subsystem 102, 102' may include a temperature sensor 502 and an array of heating sources 504. Although two heating sources 504 are depicted, it is contemplated that one, or three or more, heating sources may be utilized. In some embodiments, the temperature sensor 502 may be an infrared (IR) temperature sensor or a thermal imaging camera. The heating sources 504 may include any combination of light-emitting diodes (LEDs), high-intensity LEDs, bulbs, lasers, or other illumination sources. The array of heating sources 504 may apply one or more amounts, e.g., pulses, of heat to the powder bed 124, 124', causing the temperature of the powder bed 124, 124' to increase. The temperature sensor 502 may measure the temperature of the powder bed 124, 124' over a certain period of time. Based on the rate of change in temperature, the density of the powder bed 124, 124' may be determined. In some embodiments, the temperature rate of change may depend on one or more of the following non-limiting factors: (1) powder density, (2) powder bed thermal diffusivity, (3) heat absorption rate of the powder to illumination, or (4) a thickness of the powder bed 124, 124'.

In still other embodiments, direct measurement of density of the powder bed 124, 124' may be based on the following: (1) measurement of the acoustic properties of the powder bed 124, 124' (e.g., measuring the acoustic properties using ultrasonic transmission, reflection, among others), (2) X-ray transmission or reflection measurements of the powder bed 124, 124' (e.g., computer tomography (CT) scans), (3) beta transmission or reflection measurements of the powder bed 124, 124', (4) microwave transmission or reflection measurements of the powder bed 124, 124', or (5) optical measurements of the powder bed 124, 124' to determine the area fraction occupied by the powder.

It may also be possible to indirectly measure the density of the powder bed 124, 124' based on one or more of the following: (1) measurement of the height of a powder pile ahead of the compaction roller or (2) measurement of the force on the compaction roller (shear and normal). These indirect measurements may then be correlated to determine powder bed density.

Because the powder material may tend to consolidate when the binder material 132' is dispensed on the powder bed 124, 124', it may be beneficial to measure the density of the printed object 134, 134' (i.e., where the binder material 132' has been dispensed in the powder bed 124, 124') instead of, or in addition to, the density of the powder in the powder bed 124, 124'. While any of the above-mentioned techniques may be utilized to measure the density of a powder bed 124, 124', only a subset may be used to measure the density of powder on which binder has been deposited (i.e., the printed object 134, 134').

In one aspect, the density measurements taken may be used as one component of a Statistical Process Control method—that is, to determine whether the additive manufacturing process is performing as desired. In one embodiment, a measured density from a region of the powder bed, or of one or more layers, or of a part or parts in the powder bed, or of fully printed powder bed, may be compared to a predetermined density target. If the measured density differs from the target density, an action may be taken by the printing system. In some embodiments, the action may consist of changing a setting or parameter on the printing system in response to the measured density. In other embodiments, the action may consist of alerting an operator of the printing system, by means of an alarm or other notification, that the measured density violates the control rule or rules in place. In still other embodiments, the action may include pausing the printing process until a corrective action may be taken or stopping the print to be scrapped and restarted. In other embodiments, one or more parts being produced in the powder bed may be identified as non-conforming (failing) due to its measured density violating the rules described by the Statistical Process Control; and such a non-conforming part may be recorded in a database and flagged for later removal to from any subsequent process steps. In this way, good (conforming) parts may be separated from bad (non-conforming) parts, avoiding extraneous processing on failing parts and ensuring resulting quality of parts that are fully processed. As will be understood by one skilled in the art, the rules used for Statistical Process Control may be more complex than comparing a measured density to a predetermined target density, and may include detection of trends (for example, decreasing density over a period of time), detection of variability (for example, an increased range or standard deviation of density measurements within a layer or from layer to layer), or other trends, patterns, or statistical inferences from the collected data.

In another aspect, there are provided methods and systems for improving the uniformity of the powder bed density by employing a closed-loop control system based on the powder density measurements taken, e.g., as described above. In some embodiments, the closed-loop control system may include measuring the density of the powder bed 124, 124' during printing, and adjusting one or more process control parameters to adjust the density of the powder bed 124, 124' based on the measurement, as will be described in further detail below. While the embodiments described below are in reference to the binder jet fabrication subsystem 102', it is understood that the embodiments may apply to the binder jet fabrication subsystem 102 or any other variation of the binder jet fabrication subsystem 102, 102'.

Figure 6:
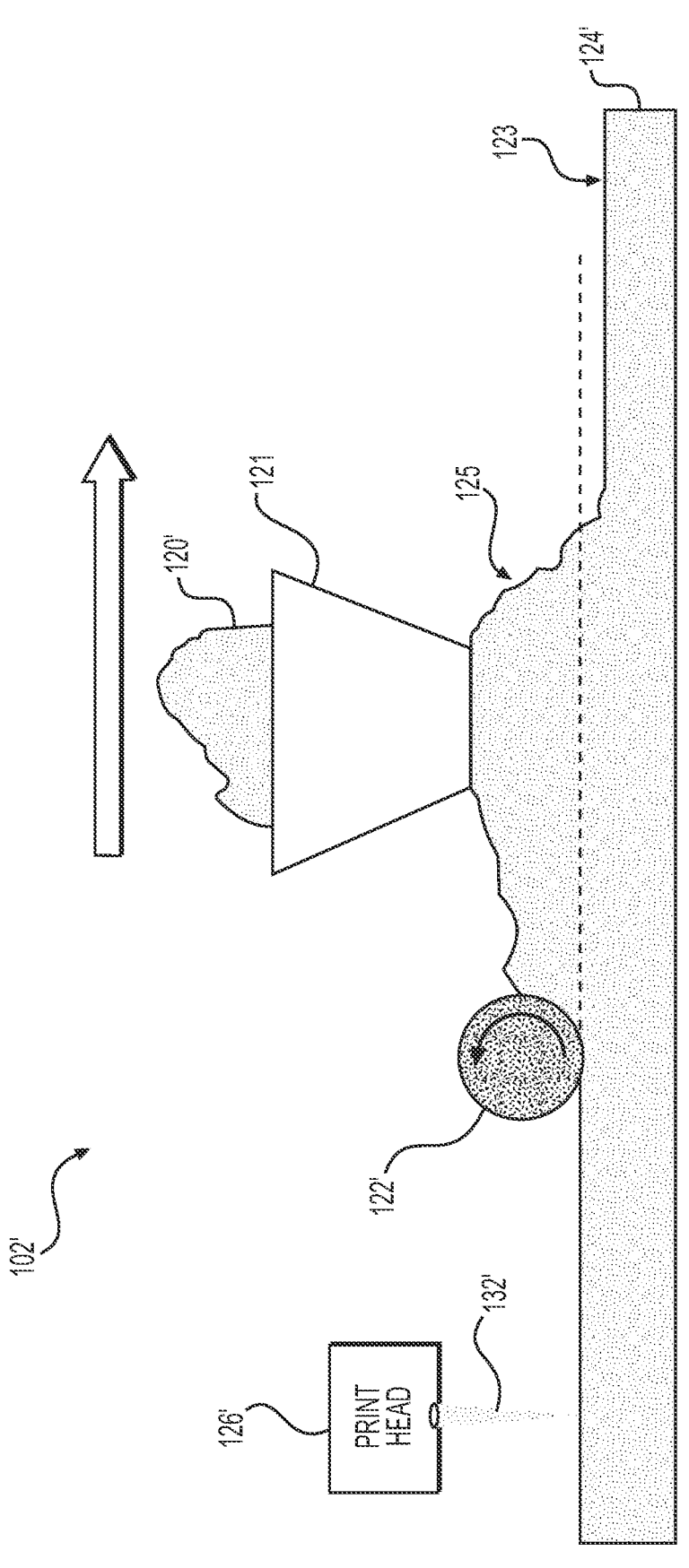
FIG. 6 illustrates an exemplary printing subsystem according to some embodiments of the disclosure.

FIG. 6 shows the binder jet fabrication subsystem 102' according to some exemplary embodiments. The density of the powder bed 124' may be adjusted by modulating a powder metering rate from the hopper 121 onto a top surface 123 of the powder bed 124'. In some embodiments, a height of the pile 125 of powder on top surface 123 ahead of the one or more spreaders 122' or compaction rollers (e.g., if there are separate spreader and compaction rollers) may be detected. The detected height of the pile 125 may be compared to a predetermined threshold, and the powder metering rate may be adjusted if the detected height of the pile 125 falls below or exceeds the predetermined threshold, plus or minus an acceptable amount of deviation. Adjusting the powder metering rate may adjust the height of the pile 125 of powder on top surface 123 ahead of the one or more spreaders 122' or compaction rollers, which may affect powder bed density as more or less powder is compacted into a layer having a pre-determined height. For example, if more powder (i.e., a higher pile of powder) is compacted into a layer of a given height, it will have a higher density than a relatively shorter pile of less powder is compacted into a layer of a given height. Therefore, the metering rate can be increased or decreased to create higher or shorter piles of powder to be compacted into a layer, thereby creating more or less dense layers of powder. In some embodiments, the powder metering rate may be adjusted based on the measured density of the powder bed 124'.

In some embodiments, other components of the binder jet fabrication subsystem 102' may be adjusted in addition to, or as an alternative to, the powder metering rate adjustment. For example, the speed of one or more of hopper 121, spreaders 122', or compaction rollers across the powder bed 124' may be adjusted. In some embodiments, the speed of the one or more of hopper 121, spreaders 122', or compaction rollers may be adjusted for each layer of the powder bed 124' on a layer-by-layer basis. In some embodiments, the speed of the one or more of hopper 121, spreaders 122', or compaction rollers may be adjusted within a layer of the powder bed 124'. That is, the speed of the one or more of hopper 121, spreaders 122', or compaction rollers may be increased, maintained, or decreased while the one or more of hopper 121, spreaders 122', or compaction rollers compact a layer of powder on top surface 123. In this aspect, real-time adjustment of powder bed measurement may be attainable. As another example, a traverse speed (i.e., horizontal speed) of the print head 126' across powder bed 124' may be adjusted.

Figure 7:
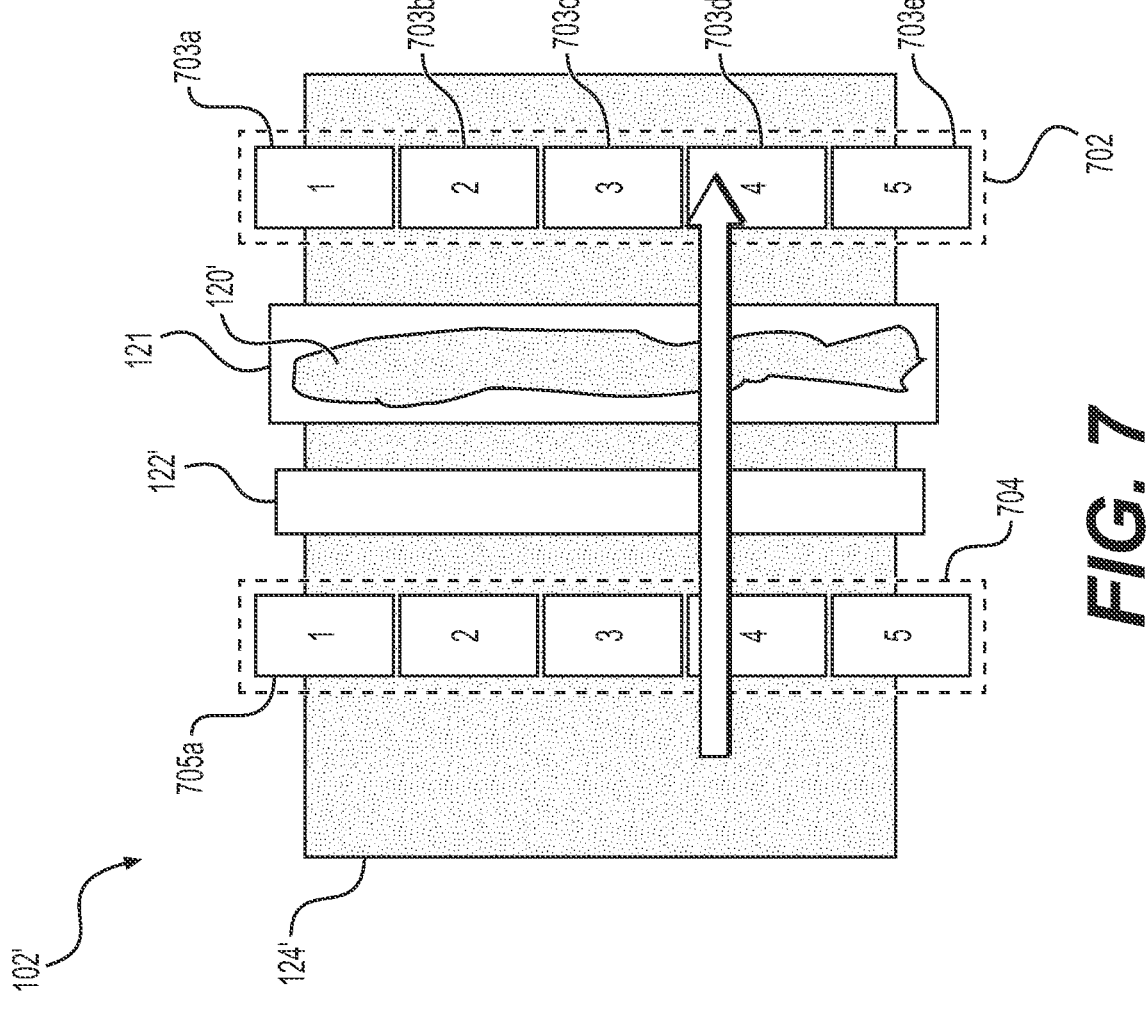
FIG. 7 illustrates a top view of an exemplary printing subsystem according to some embodiments of the disclosure.

As yet another example, a saturation of the binder material 132' may be modified. As described above with reference to FIGS. 1B-1C, the binder material 132' dispensed from the printer head 126' may be configured to bind together powder particles. In some embodiments, the binder material 132' may bind the powder particles together differently depending on a saturation of the binder material 132'. In the context of the current disclosure, the saturation of the binder material 132' may refer to a volume of the binder material 132' as a percentage of void space. In some embodiments, in addition to, or instead of, modifying one or more process parameters to control density of the powder bed 124', it may be possible to compensate for density variation, e.g., during the printing process. For example, as each layer of powder is spread, or after spreading of a layer and before deposition of binder material 132', density of the powder bed 124' may be measured according one or more of the methods described above. This may be achieved by increasing the amount of binder material 132' deposited if the density measurement falls below a given threshold or decreasing the amount of binder material if the density measurement falls below a certain threshold value. Additionally or alternatively, the 2D or 3D shape of the printed pattern may then be modified based on the density measurement to compensate for variances in density measurement across the layer and/or from an anticipated density value to achieve the desired characteristics/dimensions of the part after sintering or shrinking. As such, the amount of binder material dispensed from the printer head 126' may be adjusted based on a measured density of the powder bed 124', or a density measurement of the printed object. In some embodiments, the saturation value may be preconfigured. For example, the amount of the binder material dispensed from the printer head 126' may be adjusted based on a measured density of the powder bed 124' such that the saturation of the binder material may be maintained at the preconfigured saturation value. Thus, as the density in the powder bed 124' varies, the amount of binder material 132' deposited may also vary to achieve the preconfigured saturation value. As another example, if a density of the powder bed 124' is measured to be lower than a target value, the 2D pattern to be printed may be modified (size increased) to account for a larger degree of shrinkage that may occur during sintering step, resulting in a part which still achieves the desired dimensional accuracy. Control of the powder bed density may also be accomplished by modulating the application of steam to the powder bed 124'. For example, FIG. 7 shows a top view of the binder jet fabrication subsystem 102' according to some embodiments. As shown in FIG. 7, the binder jet fabrication subsystem 102' includes one or more powder bed density sensors 702 and one or more steam generators 704. In some embodiments, the one or more powder bed density sensors 702 may be configured to utilize any of the measurement methods described herein or any combinations thereof. The one or more steam generators 704 may apply steam to the powder bed 124' based on a measurement of the powder density by the one or more powder bed density sensors 702. Condensation of the applied steam may cause densification of the powder bed 124'. In some embodiments, certain parameters of the applied steam, e.g., volume, temperature, etc., may be adjusted based on the measured powder density. Varying the parameters of steam application as a function of time and space may allow for local control of the degree of densification of the powder bed 124'.

For example, the one or more powder bed density sensors 702 may measure a density of the powder bed 124' at portion 703*a* along the direction of travel (depicted as an arrow in FIG. 7). In some instances, the measured density of the powder bed 124' at portion 703*a* may be lower or higher than that of the other portions 703*b-e* along the direction of travel. In such instances, the one or more steam generators 704 may adjust the steam applied to the powder bed 124' by portion 705*a* along the direction of travel. In some embodiments, the one or more steam generators 704 may be configured to determine a two-dimensional (2D) pattern in which steam may be applied for each layer of the powder bed 124'. In some embodiments, the one or more steam generators 704 may be fluidly connected to the print head 126'. In such embodiments, the print head 126' may be configured to apply the steam on the powder bed 124' in accordance to the determined 2D pattern for each layer of the powder bed 124'.

Control of the powder bed density may also be accomplished by modulating the relative humidity of the environment inside the printing device. In some embodiments, the relative humidity of a powder while it is being spread or compacted may affect the density of the powder bed. In some embodiments, the one or more powder bed density sensors 702 may be configured to utilize any of the measurement methods described herein or any combinations thereof. The relative humidity inside the printing device may be controlled, for example, but means of a device configured to add humidity (water vapor) into the printer, in order to increase the humidity; or by means of a flow of dry air or gas in order to displace humid air from the printing device. In this way, the humidity level can be increased or decreased.

As another method of controlling powder bed density, in some embodiments, the binder jet fabrication subsystem 102' may comprise one or more acoustic wave generators configured to control the density of the powder bed 124, 124'. For example, the one or more acoustic wave generators may generate acoustic waves based on a measurement of the powder density by the one or more powder bed density sensors described above. The generated acoustic waves may be directed towards the top surface of the powder bed 124, 124'. In some embodiments, a high intensity acoustic wave may compress the powder. Accordingly, if a density measurement of the powder bed 124, 124' falls below a predetermined threshold, then the acoustic wave generators may be activated to generate acoustic waves to increase the density of the powder bed 124, 124'. In some embodiments, the generated acoustic waves may repeatedly lift and compress the powder to promote a higher and more uniform powder density distribution.

In some embodiments, software geometry compensation may be performed in a static mode. For example, if a variation of the measured powder bed density is consistent (e.g. from a center to an edge of the powder bed 124', etc.), the one or more 3D objects 134 may be scaled accordingly prior to starting printing.

Figure 8:
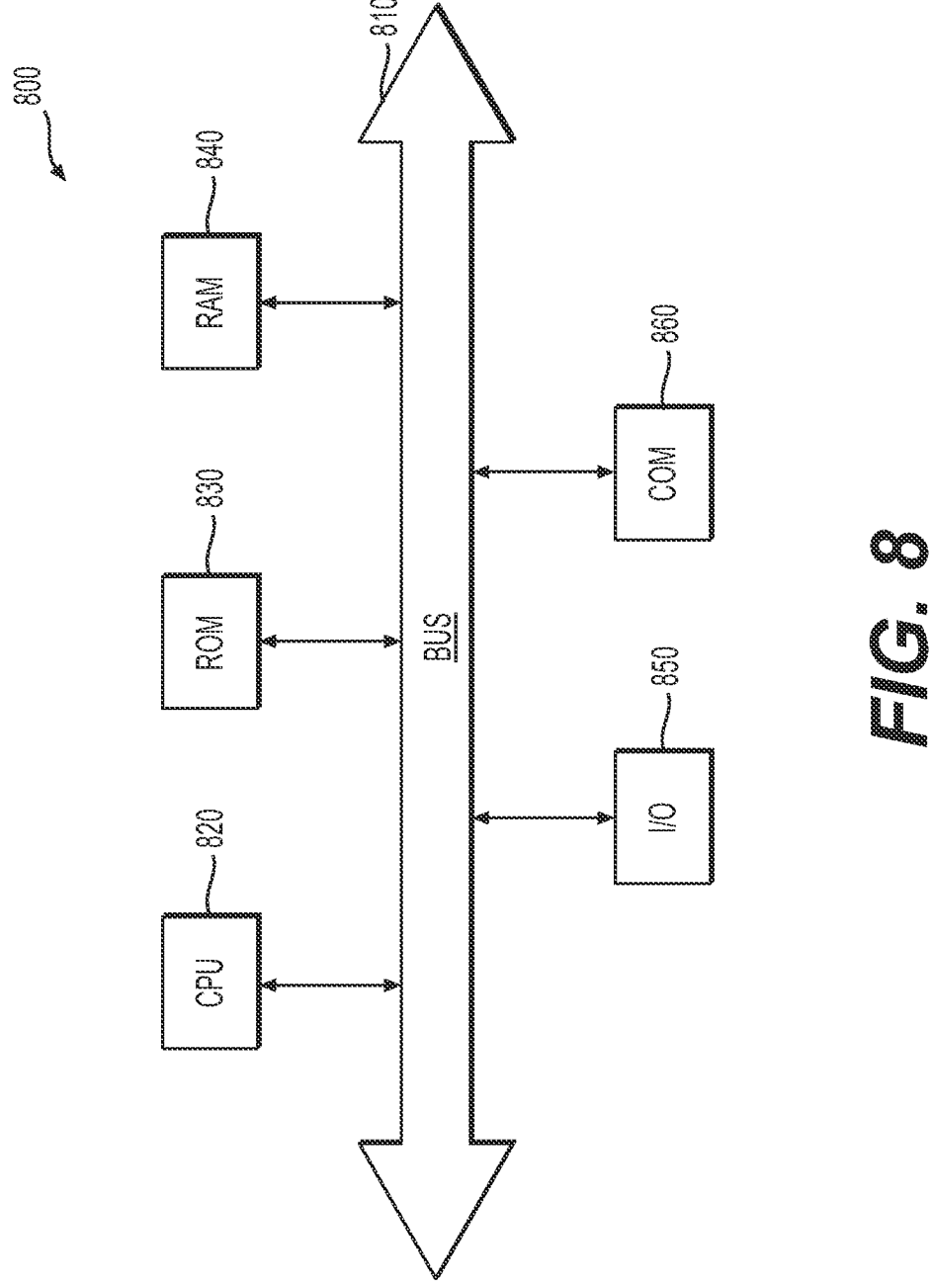
FIG. 8 depicts an exemplary computer device or system, in which embodiments of the present disclosure, or portions thereof, may be implemented.

As shown in FIG. 8, a device 800 used for performing the various embodiments of the present disclosure (e.g., the controller 128, 128', the controller subsystem 116, the various subsystems disclosed herein, or any other computer system or user terminal for performing the various embodiments of the present disclosure) may include a central processing unit (CPU) 820. CPU 820 may be any type of processor device including, for example, any type of special purpose or general-purpose microprocessor device. As will be appreciated by persons skilled in the relevant art, CPU 820 also may be a single processor in a multi-core/multi-processor system, such system operating alone, or in a cluster of computing devices operating in a cluster or a server farm. CPU 820 may be connected to a data communication infrastructure 810, for example, a bus, message queue, network, or multi-core message-passing scheme.

A device 800 (e.g., the controller 128, 128', the controller subsystem 116, the various subsystems disclosed herein, or any other computer system or user terminal for performing the various embodiments of the present disclosure) may also include a main memory 840, for example, random access memory (RAM), and may also include a secondary memory 830. Secondary memory 830, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example may read from or write to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software or data.

In alternative implementations, secondary memory 830 may include other similar means for allowing computer programs or other instructions to be loaded into device 800. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 800.

A device 800 may also include a communications interface ("COM") 860. Communications interface 860 may allow software and data to be transferred between device 800 and external devices. Communications interface 860 may include a modem, a network interface (such as an Ethernet card), a communications port, a PCMCIA slot and card, or the like. Software and data transferred via communications interface 860 may be in the form of signals, which may be electronic, electromagnetic, optical, or other signals capable of being received by communications interface 860. These signals may be provided to communications interface 860 via a communications path of device 800, which may be implemented using, for example, wire or cable, fiber optics, a phone line, a cellular phone link, an RF link, a wireless connection (e.g., Bluetooth connection, wireless local are network (WLAN) connection, and cellular network connection) or other communications channels.

The hardware elements, operating systems, and programming languages of such equipment are conventional in nature, and it is presumed that those skilled in the art are adequately familiar therewith. A device 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc., are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc., can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software.

It is intended that the specification and examples be considered as exemplary only, with a true scope and spirit of the disclosure being indicated by the following claims.

The invention claimed is:

1. A method of forming a three-dimensional object using additive manufacturing, the method comprising:

depositing a first amount of metal powder material onto a powder print bed of a printing system;

spreading the first amount of metal powder material across the powder print bed to form a first layer;

measuring a density of the powder material within the powder print bed; and adjusting a parameter of the printing system based on the measured density of the metal powder material within the powder print bed, wherein adjusting the parameter of the printing system includes:

determining an amount of binder material to be deposited on a second layer based on the measured density of the metal powder material within the powder print bed;

depositing a second amount of metal powder material onto the first layer;

depositing the amount of binder material on the second amount of metal powder material.

2. The method of claim 1, further comprising:

comparing the density of the metal powder material to a predetermined criteria.

3. The method of claim 1, wherein adjusting the parameter of the printing system includes:

determining a second amount of metal powder material to be deposited onto the powder print bed based on the measured density of the metal powder material within the powder print bed;

depositing the second amount of metal powder material onto the powder print; and spreading the second amount of metal powder material across the powder print bed to form a second layer.

4. The method of claim 1, wherein adjusting the parameter of the printing system includes:

determining an amount of steam to administer to the second layer based on the measured density of the metal powder material within the powder print bed; and applying the determined amount of steam to the second layer.

5. An additive manufacturing system for forming a three-dimensional object, the system comprising:

a hopper configured to deposit powder material onto a powder print bed;

a spreader configured to spread the deposited powder material to form a layer;

a powder density measuring apparatus configured to measure a density of one or more accumulated powder material layers on the powder print bed;

a controller configured to adjust a parameter of the system based on the measured density of the one or more accumulated powder material layers; and a print head configured to deposit an amount of binder material to at least one region of the layer, wherein the controller is configured to control the amount of binder material based on the measured density of the one or more accumulated powder material layers on the powder print bed.

6. The system of claim 5, wherein the powder density measuring apparatus includes a sensor configured to determine a height of the deposited powder material, and wherein the controller is configured to control a speed at which to spread the deposited powder material based on the determined height of the deposited amount of powder material.

7. The system of claim 5, wherein the print head is further configured to apply an amount of steam to the layer, and wherein the controller is configured to control the amount of steam based on the measured density of the one or more accumulated powder material layers on the powder print bed.

8. The system of claim 5, further comprising an acoustic wave generator operably coupled to the controller, wherein the acoustic wave generator is configured to generate one or more acoustic waves based on the measured density of the one or more accumulated powder material layers on the powder print bed.

9. The system of claim 5, wherein the powder density measuring apparatus is configured to determine a weight of the one or more accumulated powder material layers on the powder print bed.

10. The system of claim 9, wherein the powder density measuring apparatus is further configured to determine a volume of the one or more accumulated powder material layers on the powder print bed.

11. The system of claim 5, wherein the powder density measuring apparatus is configured to measure at least one of an inductance or a capacitance of the one or more accumulated powder material layers on the powder print bed.

12. The system of claim 5, wherein the powder density measuring apparatus includes:

one or more heaters configured to apply heat to the one or more accumulated powder material layers on the powder print bed; and a temperature sensor.

13. The system of claim 12, wherein the controller is configured to determine the density of the one or more accumulated powder material layers based on a rate of change in temperature detected by the temperature sensor.

14. An additive manufacturing system for forming a three-dimensional object, the system comprising:

a hopper configured to deposit powder material onto a powder print bed;

a spreader configured to spread the deposited powder material to form a layer;

a powder density measuring apparatus configured to measure a density of one or more accumulated powder material layers on the powder print bed, wherein the powder density measuring apparatus is further configured to measure at least one of an inductance or a capacitance of the one or more accumulated powder material layers on the powder print bed; and a controller configured to adjust a parameter of the system based on the measured density of the one or more accumulated powder material layers.

\* \* \* \* \*